2,791,615
ETHER PURIFICATION

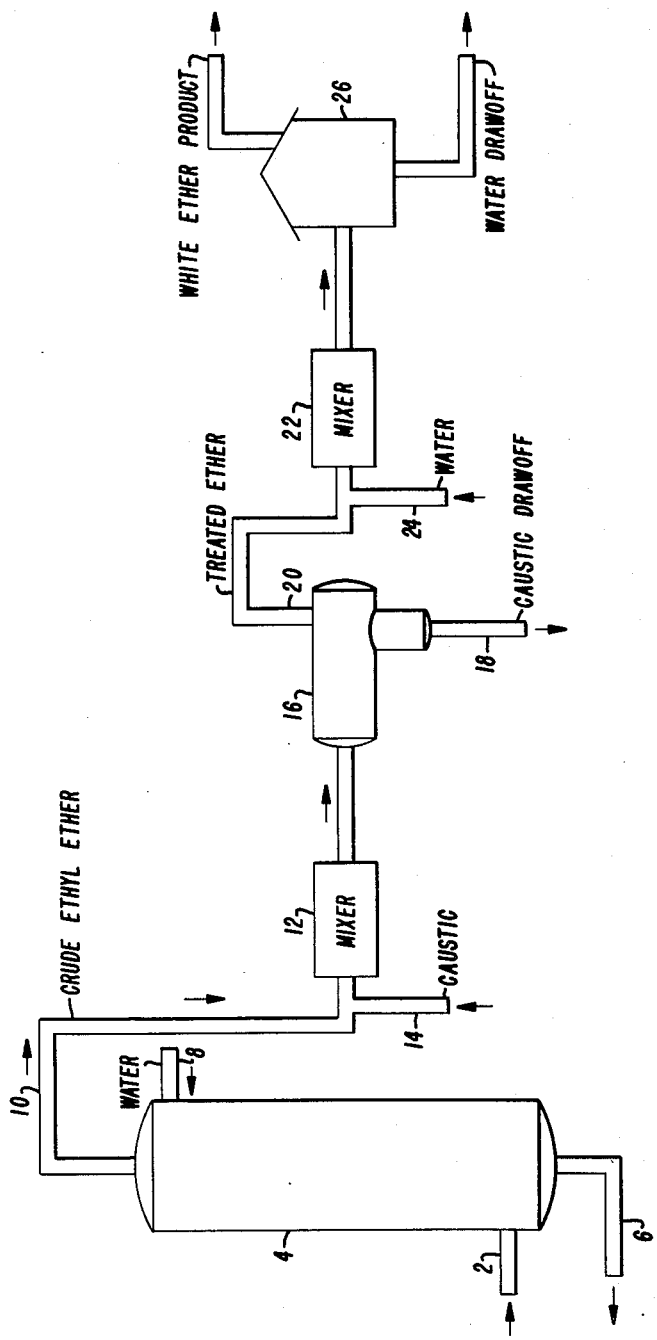
ERWIN W. NOMMENSEN INVENTOR
BY Richard N. Nagel ATTORNEY

Erwin Ward Nommensen, Baton Rouge, La., assignor to Esso Research and Engineering Company, a corporation of Delaware Application March 1, 1955, Serial No. 491,304

6 Claims. (Cl. 260—616)

The present invention relates to a method of purifying a crude volatile aliphatic ether. More particularly, the present invention relates to the purification of crude ethyl ether such as that formed by the reaction of ethylene with sulfuric acid, which is contaminated with acidic materials and color-forming bodies.

Crude ethyl ether as commercially synthesized generally contains water, alcohol, and acidic contaminants, and is generally recovered in 5–20% yields based on ethanol in the commercial manufacture of ethanol from ethylene by absorption in $H_2SO_4$ followed by hydrolysis of the resulting extract with water. The ethanol and ether are obtained from the hydrolized extract by distilling them out as an overhead stream, while the acid is obtained as a bottoms product and is reconcentrated for reuse. The overhead stream, or crude ethanol, thus is a mixture of ethanol, ethyl ether, water, and small amounts of secondary reaction products. The ether and alcohol are separated by distillation, the overhead being a mixture consisting largely of ether with minor amounts of water and alcohol. The composition of the overhead and the bottoms streams obtained in this separation depends upon process conditions and efficiency of fractionation. If the overhead contains considerable alcohol, it may be waterwashed to extract the alcohol, the water solution of alcohol being returned to the preceding distillation step where the gross separation is made between ether and alcohol. The ether at this stage is satisfactory for general industrial purposes in which extreme purity is not critical, such as:

(1) Cracking of the ether to produce ethylene, (2) as an intermediate in the production of other chemical compounds, and (3) alone or in combination with other solvents as a solvent for explosives.

The crude ether, however, is unsatisfactory in cases where a pure product is required, such as (1) the extraction of vegetable oils and fats, (2) in anesthesia, and (3) in the manufacture of rayon plastics, in that it is associated with an undesirably high acidity resulting from the presence of organic acids formed as secondary reaction products and also of acidic compounds formed in the absorption step, or subsequently, from the sulfuric acid. To prepare a high quality ether, these acidic materials must be removed, and this is commonly done by treating with an aqueous alkali, such as caustic. Thus it is common practice to inject a 10% caustic solution into the ether on the way to intermediate storage and to draw off periodically the caustic layer from the storage tank. It has been found, however, that this treatment induces the formation of color bodies, possibly due to the formation of condensation products of the aldol type. This is highly undesirable in a high quality ether, and requires an additional redistillation step to remove the color bodies which form. This requires extra equipment and inevitably leads to decrease in yields of ether.

An object of the present invention is to provide an efficient method of preventing color formation in caustic treated finished ether product.

A still further object of the present invention is to simplify the finishing of diethyl ether to avoid the necessity of the redistillation step currently found necessary.

Other and further objects and advantages of the present invention will become apparent hereinafter:

It has now been found that the color-forming characteristic is associated with the length of time in which the ether is in contact with the caustic, and in particular with caustic of the strength such as 10% solution hitherto considered necessary. Thus caustic treated ether in storage developed a dark yellow color, greater than 500 (Hazen) on standing with a very small amount (1–2 volume percent) of caustic in the bottom of the storage tank. Caustic cannot be completely removed from a storage tank, even with a bottom drain valve, for it holds up in pockets and the like. In addition, fresh caustic is continually entering the tank either because it is entrained in the ether or is not separated from the ether.

In accordance with the present invention, color formation in finished ether is substantially prevented and the need for a redistillation step obviated by separating the ether substantially immediately from the caustic washing solution. Contact time of ether with the caustic should be of the order of 30 to 60 minutes, depending on the strength of the caustic, and in no event longer than 24 hours. Furthermore, in a preferred embodiment of the present invention, the alkali solution should be of a concentration less than 0.5% alkali in water. For best results, caustic treatment may be followed by a waterwash to prevent entrained caustic from entering the storage tanks.

A preferred procedure by which the invention is practiced will be described by reference to the accompanying drawing, which is a schematic flow plan of a continuous ether refining system.

Referring to the drawing, crude diethyl ether which has been separated in a conventional manner from the bulk of the ethanol in an initial separation zone (not shown) is passed via line 2 to a water washing vessel 4 which is adapted to wash out any alcohol and water soluble components in the ether product. Water is passed in countercurrently through line 8 and wash water passed through line 6 to the ether-ethanol separation still. Vessel 4 may be equipped with means for agitation and baffles for effecting contact of the immiscible liquids. A temperature of 90° F. or less is maintained at atmospheric pressure. Higher temperatures may be used at higher pressures, so long as conditions are such that the ether is not above its boiling point. The crude ethyl ether layer, still containing acidic impurities, is withdrawn from the top of vessel 4 via line 10 and is passed to mixer 12, which may be of any conventional type known to the art. Caustic solution having a concentration of not more than 0.5 wt. percent of caustic, and preferably 0.2 to 0.4 wt. percent is passed into mixer 12 via line 14. The proportions of caustic solution to ether is in the range of 1 to 10 vol. percent. The mixer is at a temperature of 30–90° F. After thorough agitation the solution is passed to separator 16 where the layers are allowed to stratify, and the lower caustic layer drawn off through line 18. Residence time in the separator is 30 to 60 minutes, and in no case greater than 24 hours.

Though not essential if no caustic is entrained, nonetheless the treated ether is preferably washed with water in mixer 22, water for this purpose being admitted through line 24. Mixer 22 may be of similar construction to mixer 12.

The ether-water mixture is now passed to a settler tank 26, from which water may be withdrawn downwardly, and a water-white, pure ether withdrawn as needed. A redistillation treatment is not necessary.

An important feature of the present invention is the time of contact of the crude ether with the aqueous alkali. In the preferred modification described above, employing less than 0.5% concentration of caustic, contact time must be no longer than 24 hours. If a 10% or higher caustic solution be employed, contact time must be no longer than 30–60 minutes. Longer contact, even if followed by washing, produces an unsatisfactory product. An intermediate caustic solution would require a maximum time of contact intermediate to the above values.

The process of the present invention may be subject to many modifications without departing from the spirit thereof.

For example, the caustic washing step and/or the water washing step may be carried out in one or more towers, in which crude ether enters the bottom of the tower and is passed counter-current to the caustic solution or the wash water. These operations could also be carried out batchwise in mixing agitators. Furthermore, other aqueous alkaline washing media, such as potash, alkali carbonates and the like, may be employed. In general, alkyl ethers, such as isopropyl ether, and the like, may be purified in this manner.

The process of the present invention may be illustrated by the following specific examples.

Example 1

Crude ether having an acidity of 0.016 wt. percent as acetic acid was treated with 2 vol. percent of 10 wt. percent caustic solution. The acidity was reduced to 0.001, but the color after only a few hours was 500 (p. p. m. on the Hazen Pt-Co color scale). A color of less than 20 is desirable, and preferably less than 5.

Example 2

Crude ether was treated with caustic solutions of various strengths, and then stored in contact with the caustic. As shown below, the ether is color stable for 1–2 days when treated with dilute (less than 0.5 wt. percent) caustic.

| Wt. Percent Caustic in Wash Solution | Ether Color, Hazen, After Days Shown | | |
|---|---|---|---|
| | 1 | 3 | 10 |
| 11 | 500 | | |
| 2 | 500 | | |
| 1.7 | 500 | | |
| 0.7 | 50–150 | 500 | |
| 0.5 | 5–50 | 500 | |
| 0.4 | 5 | 20 | 500 |
| 0.25 | 5 | 20–75 | 500 |

Example 3

Portions of the same samples shown above were also separated immediately from the caustic. All samples maintained their color of <5 for at least 10 days, which was the maximum time samples were stored.

Example 4

Crude ether was caustic washed with 2 vol. percent of 10 wt. percent caustic, the caustic layer was separated, the ether was water washed, and stored in contact with the slightly alkaline wash water. The ether maintained its color of <5 for at least 10 days, the maximum time the sample was stored.

In a commercial plant operating in a manner substantially identical with that heretofore described, the installation of the facilities to separate the caustic from the ether immediately, plus additional water washing, brought the ether color down from a dark yellow color, greater than 500, to a color of less than 5 during storage. Samples of the treated ether before water washing also maintain a good color except during those periods when caustic is entrained in the ether.

What is claimed is:

1. In the process wherein crude alkyl ether corresponding to the formula R—O—R wherein R represents alkyl groups of 2 to 3 carbon atoms and containing acidic contaminants is treated with an aqueous alkaline solution, the improvement of preparing a finished ether product requiring no further distillation which comprises contacting said impure ether with 1 to 10% by volume of an aqueous alkaline solution containing not more than about 10% by weight of alkali of the class consisting of alkali metal hydroxides and carbonates, and separating said alkali from said ether within 1 to 24 hours of said treatment, depending on the strength of the alkaline solution used.

2. In the process wherein crude ethyl ether containing acidic contaminants is treated with an aqueous caustic solution, the improvement of preparing a finished ether product requiring no further distillation which comprises contacting said impure ether with 1 to 10% by volume an aqueous caustic solution containing about 10% by weight of caustic, passing said solution and said ether to a settling zone, allowing said material to stratify into an ether layer and an aqueous caustic layer, and drawing off an ether layer within 60 minutes from the initial contacting of said caustic with said ether.

3. An improved process for purifying acid-contaminated diethyl ether which consists of contacting in a mixing zone said ether with 1–10% by volume of an aqueous caustic solution, said solution containing less than about 0.5% by weight of dissolved caustic, passing said aqueous caustic solution and said ether to a separation zone, separating said ether from said caustic within 24 hours from the initial contacting of said ether and said aqueous caustic, and recovering a water-white finished ether product.

4. The process of claim 3 wherein said aqueous caustic solution contains about 0.2 to 0.4 wt. percent of caustic.

5. The process of claim 3 wherein the temperatures of said mixing zone is in the range from about 30° to 90° F.

6. The process of claim 3 wherein said ether recovered from said separation zone is water-washed and the water-washed ether passed to a storage zone.

References Cited in the file of this patent

UNITED STATES PATENTS 2,050,600  Cox et al. _____ Apr. 11, 1936